US011195229B1

(12) United States Patent
Olson et al.

(10) Patent No.: US 11,195,229 B1
(45) Date of Patent: Dec. 7, 2021

(54) INFORMATION DECISION MAKING AND DISPLAY

(71) Applicant: Wells Fargo Bank, N.A., San Francisco, CA (US)

(72) Inventors: Amy Jo Olson, Clive, IA (US); Michael James Dosedel, Waukee, IA (US); Vincent Charles Beggs, Alexandria, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 73 days.

(21) Appl. No.: 16/678,518

(22) Filed: Nov. 8, 2019

Related U.S. Application Data

(62) Division of application No. 14/722,927, filed on May 27, 2015, now Pat. No. 10,515,406.

(51) Int. Cl.
*G06Q 40/02* (2012.01)
*G06F 16/951* (2019.01)

(52) U.S. Cl.
CPC ......... *G06Q 40/025* (2013.01); *G06F 16/951* (2019.01)

(58) Field of Classification Search
CPC .............................. G06Q 40/025; G06F 16/951
USPC .......................................................... 705/38
See application file for complete search history.

(56) References Cited

U.S. PATENT DOCUMENTS

| | | | |
|---|---|---|---|
| 6,519,763 B1 | 2/2003 | Kaufer et al. | |
| 7,653,592 B1 | 1/2010 | Flaxman et al. | |
| 7,747,959 B2 * | 6/2010 | Keller | G06Q 40/02 715/764 |
| 7,831,978 B2 * | 11/2010 | Schaad | G06Q 10/06316 718/106 |
| 7,853,464 B2 * | 12/2010 | Bhatnagar | G06F 9/542 705/7.26 |
| 8,229,964 B2 * | 7/2012 | Sattler | G06Q 40/02 707/796 |
| 8,347,295 B1 * | 1/2013 | Robertson | G06Q 10/06 718/103 |
| 8,489,498 B1 | 7/2013 | Flaxman et al. | |
| 8,539,493 B1 * | 9/2013 | Robertson | G06F 9/4881 718/103 |
| 8,589,282 B1 | 11/2013 | Jackson et al. | |

(Continued)

OTHER PUBLICATIONS

"How Neural Networks Can Help Loan Officers to Make Better Informed Application Decisions," by Meliha Handzic Felix Tjandrawibawa and Julia Yeo. The University of New South Wales, Sydney, Australia. Jun. 2003. (Year: 2003).

*Primary Examiner* — Sara C Hamilton
(74) *Attorney, Agent, or Firm* — Merchant & Gould P.C.

(57) ABSTRACT

An information processing and display system includes a first database storing milestones associated with an approval process. A computing system is configured to access the first database and estimate start dates for the milestones. A risk of delay is determined for the milestones based on information associated with the approval process, and first adjusted start dates are estimated based on the determined risk of delay. Alternative actions associated with the determined risk of delay are determined, and second adjusted start dates based on the alternative actions are estimated. The computer generates a display of the first adjusted start dates, the alternative actions, and the second adjusted start dates.

15 Claims, 5 Drawing Sheets

(56) References Cited

U.S. PATENT DOCUMENTS

| | | | |
|---|---|---|---|
| 8,620,713 B2 * | 12/2013 | Schaad | G06Q 10/06311 |
| | | | 705/7.21 |
| 8,826,280 B1 * | 9/2014 | Robertson | G06Q 10/103 |
| | | | 718/100 |
| 8,935,334 B2 * | 1/2015 | Hon | G06F 16/44 |
| | | | 709/205 |
| 8,990,254 B2 * | 3/2015 | Corr | G06Q 40/025 |
| | | | 707/790 |
| 9,542,378 B2 | 1/2017 | Wandeler et al. | |
| 9,589,240 B2 * | 3/2017 | Rangaswamy | G06Q 10/0633 |
| 9,646,081 B1 * | 5/2017 | Volchegursky | G06Q 10/0633 |
| 10,049,332 B2 * | 8/2018 | Jones | G06Q 10/06311 |
| 10,783,577 B2 * | 9/2020 | Jacobs | G06Q 40/025 |
| 2005/0278249 A1 | 12/2005 | Jones et al. | |
| 2011/0047058 A1 | 2/2011 | Erbey et al. | |
| 2013/0346896 A1 | 12/2013 | Missout | |
| 2014/0052606 A1 | 2/2014 | Vasudevan et al. | |
| 2014/0289099 A1 | 9/2014 | Meyer et al. | |

* cited by examiner

INFORMATION DECISION MAKING AND DISPLAY

BACKGROUND

Loan origination generally refers the process of creating a loan such as a home mortgage. In other words, it is the process by which a borrower applies for a loan, and a lender processes that application, ultimately approving or declining the loan. Typically, the loan origination process includes many steps and requires the completion of many forms and other paper work. During the origination process, a potential borrower submits a variety of financial information such tax returns, prior paychecks, credit card info, bank balances, etc. to a potential lender. The lender further analyzes additional information, such as the borrower's credit report, to determine loan eligibility. More specifically, the lender determines various aspects of a type of loan, such as the amount (if any) for which the borrower qualifies, the interest rate, loan processing costs, etc. The process can be daunting for borrowers, especially those inexperienced with the process.

SUMMARY

In accordance with certain aspects of the present disclosure, an information processing and display system includes a first database storing milestones associated with an approval process. A computing system is configured to access the first database and estimate start dates for the milestones, determine a risk of delay for the milestones based on information associated with the approval process, estimate first adjusted start dates based on the determined risk of delay, determine alternative actions associated with the determined risk of delay, and estimate second adjusted start dates based on the alternative actions. A display of the first adjusted start dates, the alternative actions, and the second adjusted start dates is created and may be displayed for a user, such as a potential borrower. The information may be displayed on a user interface such as a user interface of a computer at a financial institution, for example, or on a user interface of a user's device such as a home computer, tablet computer, smart phone, etc.

DETAILED DESCRIPTION

Figure 1:
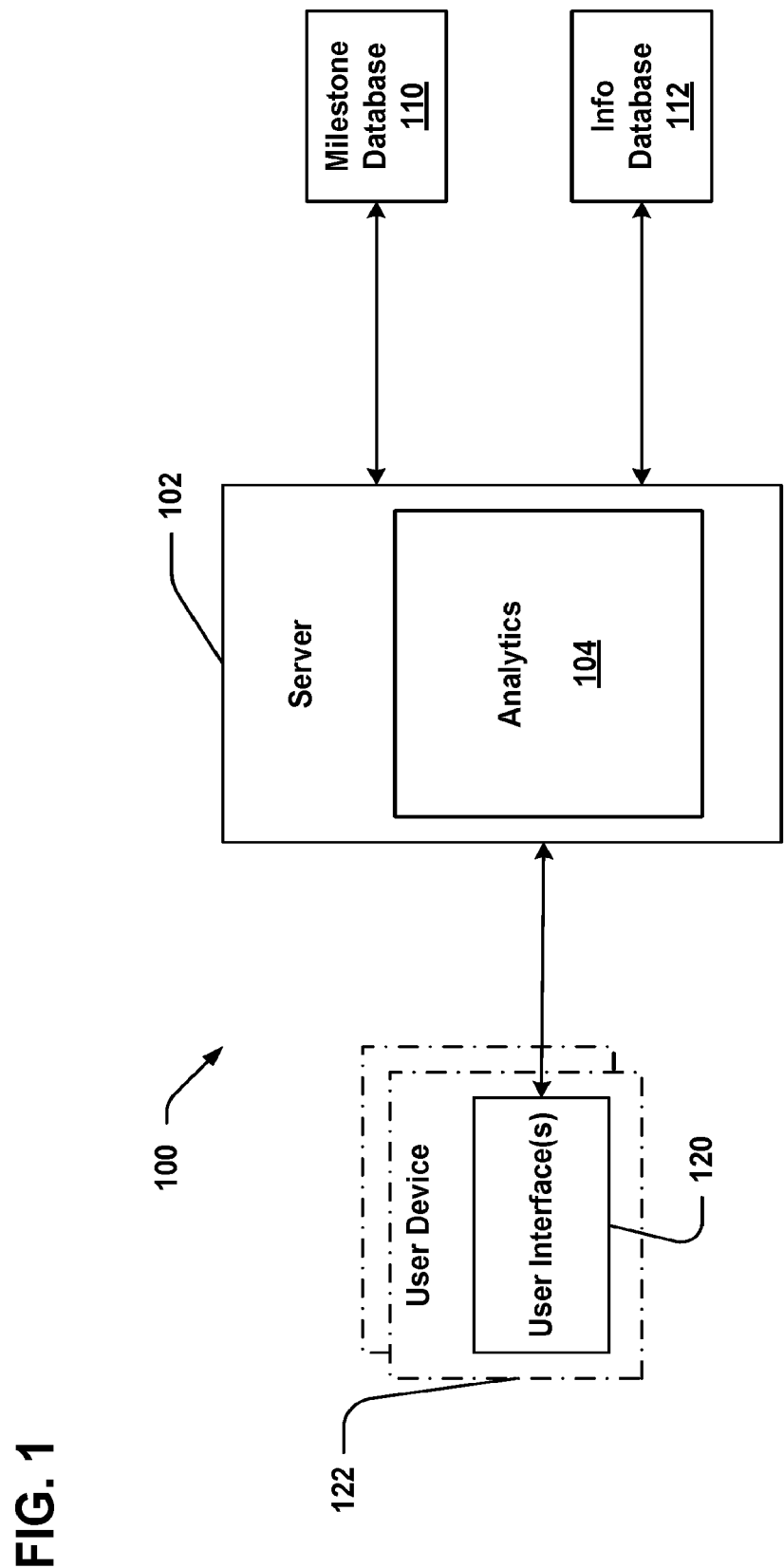
FIG. 1 is a block diagram illustrating an example of an information processing and display in accordance with aspects of the present disclosure.

In the following Detailed Description, reference is made to the accompanying drawings, which form a part hereof, and in which is shown by way of illustration specific embodiments in which the invention may be practiced. The following detailed description, therefore, is not to be taken in a limiting sense.

In general, this disclosure relates to information processing and information display systems and methods that provide a dynamic display of milestones and other information associated with an approval process, such as loan origination milestones and information for a potential borrower.

As noted in the Background section above, the loan origination process can be difficult and intimidating for borrowers, especially those inexperienced with the process, since there are many forms to be completed and information to be provided. Moreover, deadlines for various milestones are often interdependent. In other words, situations arise where a given milestone in the loan origination process cannot be completed until an earlier milestone is completed. If the earlier milestone completion is delayed, the entire process could be delayed.

Complicating the loan origination process further, many of required milestones are not readily available for review by the potential borrower, making it difficult to address possible delays and the associated negative effects on the approval process. Certain aspects of the systems and processes provided herein improve upon the operation and efficiency of various computer and network based systems, making the approval process more transparent for the borrower, providing a dynamic display of key milestone status and predictions and estimates associated with these milestones, among other things.

To make an approval process, such as a loan origination process, more efficient and transparent for a borrower, a dynamic user interface is generated and displayed in real time that includes a predictive loan origination "dashboard." Key milestone status and start and/or completion predictions and estimates are displayed for the borrower in some implementations using one or more computer systems. The system determines or sets the milestones associated with the origination process. For example, the origination process can include completing the loan application, selecting an appropriate loan product, collecting required documentation (e.g., tax documents, credit score, employment pay receipts, etc.), appraisal/home value assessment, selecting add-on products, and signing the completed application.

The disclosed system estimates start dates for the various milestones, and collects data regarding the estimated start dates for the milestones. For example, the data can include information from internal financial institution databases and external databases, such as assessor past performance, resource availability, etc. Vendors involved with the loan origination process may be provided an interface (e.g., an application programming interface, or "API") to provide relevant data to the engine. The system then makes a delay risk assessment of the milestones based on the collected data and adjusts the milestone start dates based on the delay risk assessment. For example, past performance of an appraiser, resource availability, and the like can affect the start dates for various milestones in the process, which can in turn affect milestones further down the line. The milestone start date estimates are then provided to the borrower on the user interface dashboard. The dashboard may also include recommended alternative actions for the borrower based on the risk assessment address identified problems in the origination process, along with the effect on each milestone start date by taking the alternative actions. The proposed alternative actions can be selectable on the dashboard to visualize the effect on the milestone start dates by taking each action.

Thus, the disclosed systems and methods provide improvements and solutions for computer-based loan origination processes to better process and display relevant information regarding the loan origination for a borrower. For example the milestones and associated information may be stored in various databases that are integral to the loan processing computer system, or external thereto and accessible via various communication networks. Further, the generated dashboard display may be provided on the native computer system, or transmitted to any of a number of user devices to provide a dynamic, interactive user interface for the borrower to improve the overall loan origination process and provide transparency of the process to the user.

FIG. 1 is a block diagram conceptually illustrating an example system 100 that includes a computing system such as a server computer 102 implementing an approval process such as a loan origination process. In some examples, the computing system 102 is a server computer at a financial institution such as a bank, brokerage firm, mortgage company, etc. Other examples of financial institutions are possible. Further, the server 102 may be implemented by one or more computer systems. One or more databases are accessible by the server 102. In the illustrated example, first and second databases 110, 112 are accessible by the server 102, with the first database 110 being a milestone database storing milestones associated with the approval process. Depending on the type of loan being applied for, milestones may vary. For instance, a VA loan may include milestones not associated with an FHA loan, and both VA and FHA loans may include milestones not associated with a conventional loan. Thus, in the illustrated example, the computer 102 is configured to retrieve the relevant milestones for the particular approval process. The second database is 112 is an information database storing other information associated with the approval process.

The databases 110, 112 could be a local component of the server system 102, or they could be accessible by the server 102 over a network such as a business computing network or the internet. The server 102 is operable to access the first and second databases 110, 112 and determine a risk of delay for the milestones based on information associated with the approval process. The information from the first and second databases 110, 112 is applied to predictive analytics 104 such that the server 102 is configured to estimate start dates for each of the milestones. Further, the analytics 104 are configured such that the server 102 determines a risk of delay for each of the milestones based on the information received from the second database 112. The analytics then estimates adjusted start dates based on the determined risk of delay. Additionally, alternative actions that associated with the determined risk of delay are determined. These alternative actions may be, for example, proactive, corrective actions to address the delay risks. Based on these alternative actions, further, or second adjusted start dates are estimated.

The server 102 generates a display of the received and generated information, including the first adjusted start dates, the alternative actions, and the second adjusted start dates. This information may be displayed on one or more user interfaces 120, such as a monitor of the server computer 102. For example, if a potential borrower is working with a financial advisor or loan officer at a financial institution such as a bank, the information could be displayed on the user interface of the bank's computer system. In other situations, the user interface 120 is implemented by a user device 122, such as the user's home computer, tablet device, smart phone, etc. that communicates with the server 102, for example, via a network such as the internet.

Figure 2:
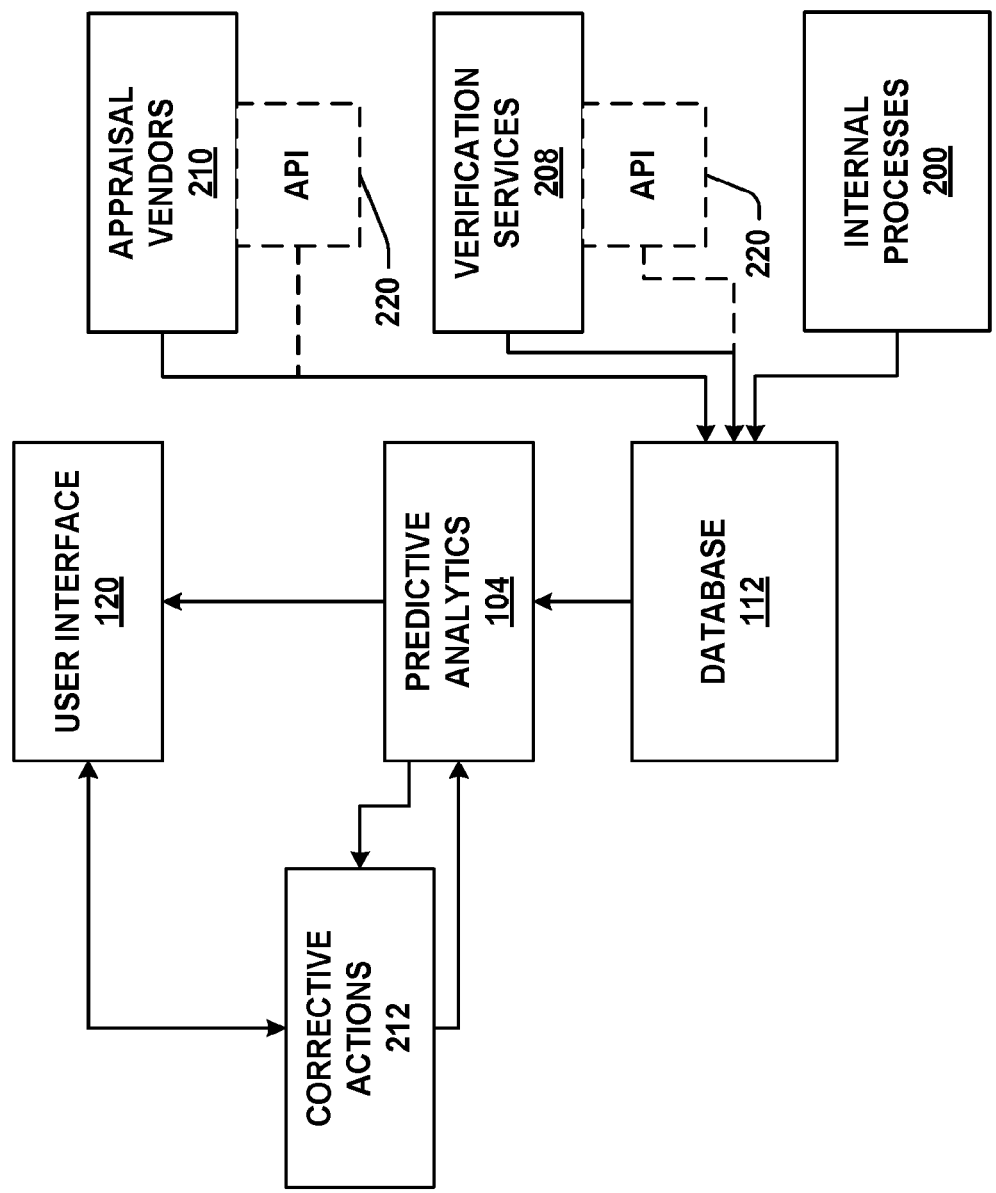
FIG. 2 is a block diagram illustrating an example of data flow for a system such as that shown in FIG. 1.

FIG. 2 is a block diagram illustrating an example data flow for the system 100 shown in FIG. 1. If the potential borrower has accounts, mortgage, loans, etc., at the financial institution associated with the server 102, information regarding the potential borrower's credit worthiness may be received from such local accounts and internal processes 200 and stored in the information database 112. Such internal account information and processes 200 provide information about internal process performance associated with the loan origination process that may have an effect on the initially estimated milestone start dates. For example, if a department of the financial institution is short staffed, they may experience delays in processing certain of the loan application documents, which could ultimately impact the start of certain milestones.

Examples of other information providers include verification services 208 and appraisal vendors 210 in the illustrated system. Verification information required for the loan origination process may include, for example, income and employment verification. The appraisal of the potential purchase property is also an important part of the loan origination process. Past performance history, current availability of services, and the like could impact the provision and receipt of the required information, which in turn could have an effect on milestone dates. Thus, the information stored in the information database 112 includes performance history and service availability of verification services 208 and appraisal providers 210 in the illustrated example.

In some implementations, an application programming interface (API) is provided, which allows service providers such as the verification services 208 and appraisal vendors 210 to interface with the computer system 102 and associated information database 112 in an automated fashion, thus further improving the flow of information to the system. In the system shown in FIG. 2, the API 220 may be used in place of, or in addition to, manual provision of the required information that is stored in the database 112.

The business process and vendor performance information from the information database 112 is provided to the predictive analytics 104, where this information is used to determine start dates and/or end dates for the relevant milestones. Additionally, based on the data in the information database 112, a risk assessment for each of the milestones is conducted to determine a risk of a delay in starting or ending a particular milestone. Based on this risk assessment, alternative start dates for the milestones may be determined. The output of the analytics 104, together with other information regarding the loan origination process, is provided in a display for the user on the user interface 120.

Alternative, or corrective actions 212 are determined by the predictive analytics 104, which may also be displayed on the user interface 120. For example, if the information database 112 includes performance history data indicating that the appraisal vendor for the particular loan provides appraisals on time 70% of the time, the analytics engine 104 could provide an alternative action of selecting a different appraisal vendor with a higher on time performance history. Associated with this action would be a revised adjusted start date, since the alternate vendor has a better on time performance history. If this action is implemented by the borrower, the start dates for the milestones is recalculated and displayed on the user interface 120. In some implementations, the user selects the desired alternative or corrective actions 212 via the user interface 120. The user selection is then fed back to the predictive analytics 104 to update the various milestone dates and display thereof.

Figure 3:
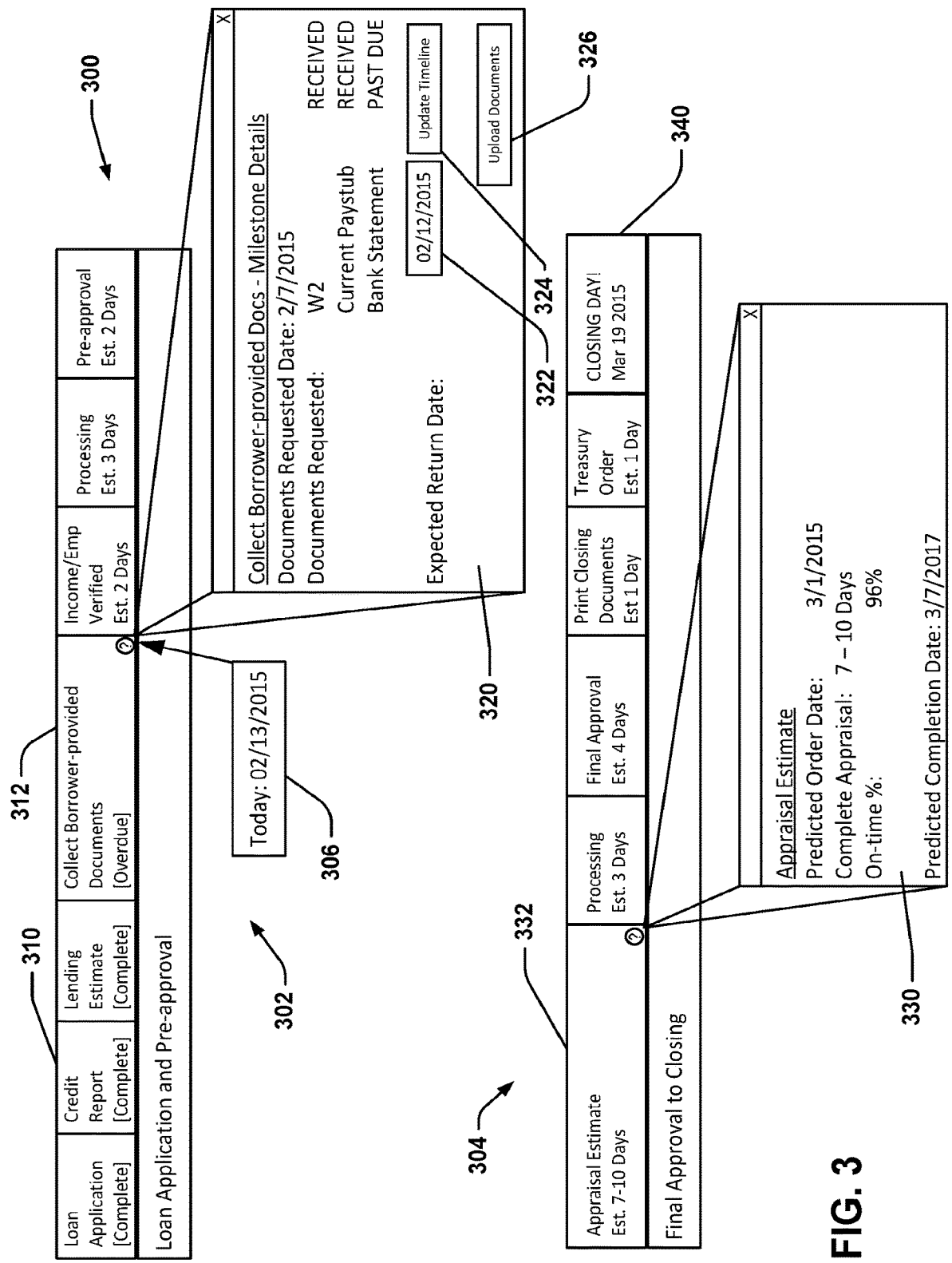
FIG. 3 illustrates an example information display.

FIG. 3 illustrates an example of the loan origination "dashboard" 300 generated by the computer 102 and displayed on the user interface 120. The dashboard 300 includes a timeline showing the selected milestones for the loan origination, as well as the time durations for the milestones. The illustrated timeline includes a first timeline 302 showing loan approval and pre-approval milestones, and a second timeline 304 showing final approval to closing milestones, and the current date 306 is further indicated. The status for each milestone is further displayed, giving the potential borrower an overall status of the origination process. The illustrated timeline 302 shows the status as complete 310 for the first three illustrated milestones: "loan application," "credit report" and "lending estimate."

The next milestone, "collect borrower-provided documents," has a status of overdue 312. In the illustrated example, the borrower can select this milestone to get further information, as shown in the information box 320. Additional information displayed includes the documents requested date, the documents received (W2 and current paystub) as well as the past due document (bank statement). The expected return date 322 is Feb. 12, 2015, while the current date is Feb. 13, 2015. Thus, the milestone 312 is overdue by one day.

The second timeline 304 shows an example of an information window 330 with additional information corresponding to the "appraisal estimate" milestone 332 displayed. This milestone is in the future, and may or may not be dependent on earlier milestones. The predicted order date of the appraisal is displayed, along with the estimated time to completion. Further, the on-time completion rate is displayed for the selected appraisal vendor at 96% on time. Since this vendor has a high on-time completion history, the predicted completion date is based on a seven day completion—the early end of the estimated completion time period of 7-10 days. Additional milestones are displayed on the timeline 304, ending with the estimated closing day 340.

Referring again to the first timeline 302, the information window 320 displays further information and actions for the borrower to consider. By notifying the borrower that a requested document is missing (bank statement), he or she can take action to provide the missing document and impact the milestone schedule. Displaying the milestones, along with the additional information regarding the milestone status provides transparency to the potential borrower, and results in a compact and efficient display of information. For example, the expected return date 322 may be updated to reflect a new expected return date.

Figure 4:
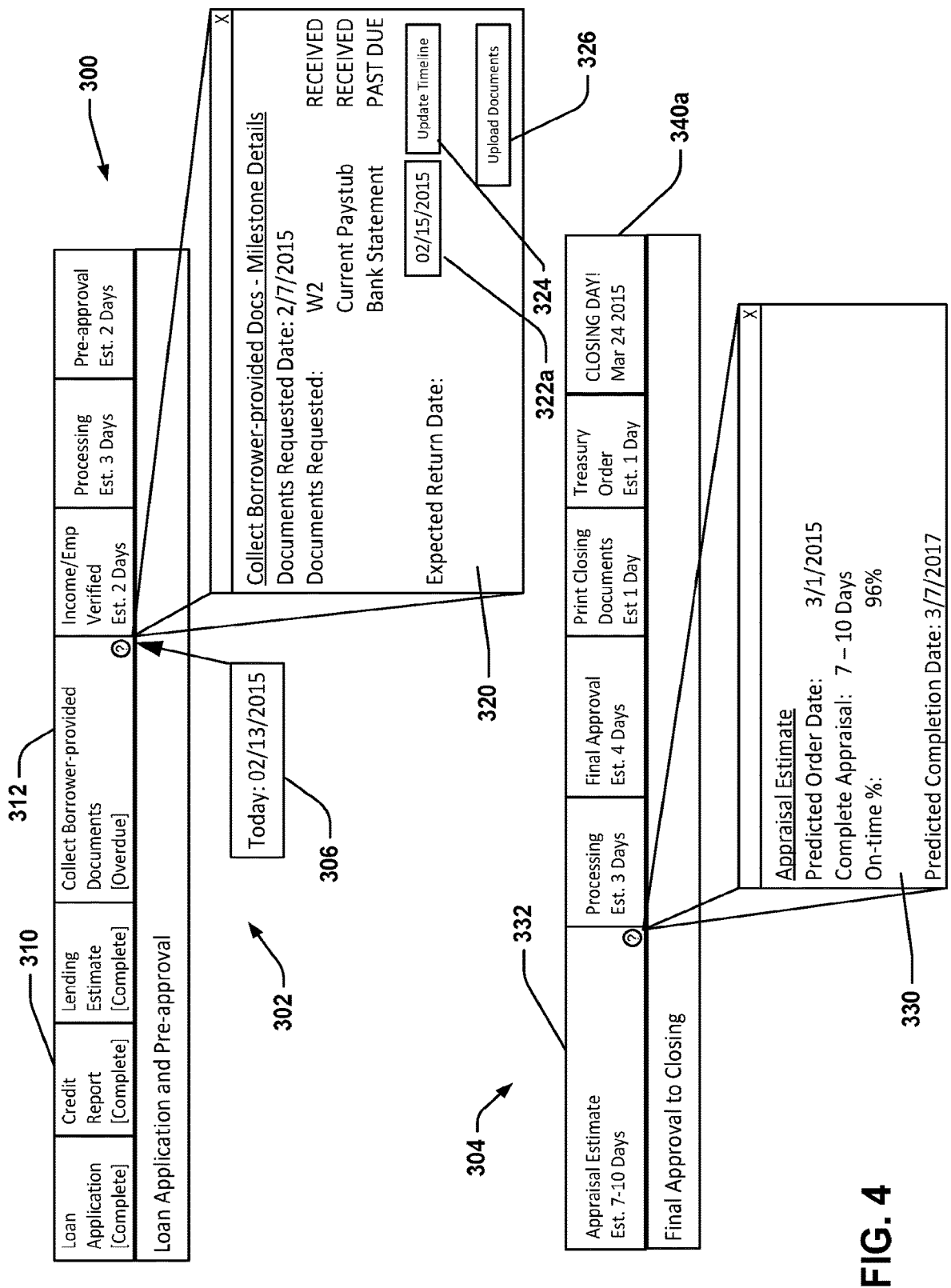
FIG. 4 illustrates the information display shown in FIG. 3 with updated milestones.

FIG. 4 illustrates the dashboard 300, with the expected return date 322a updated to Feb. 15, 2014. Delaying the completion date effects subsequent milestones. For example, delaying the receipt of the borrower-supplied documents in turn delays the start and completion of the preapproval process, which ultimately delays the closing 340 three days to Mar. 24, 2015. Returning to FIG. 3, the information window 320 also includes an action of "upload documents" 326. Notifying the borrower of the overdue milestone and providing the action 326 allows borrower to upload the missing document and maintain or only slightly delay progress of the loan origination process.

Figure 5:
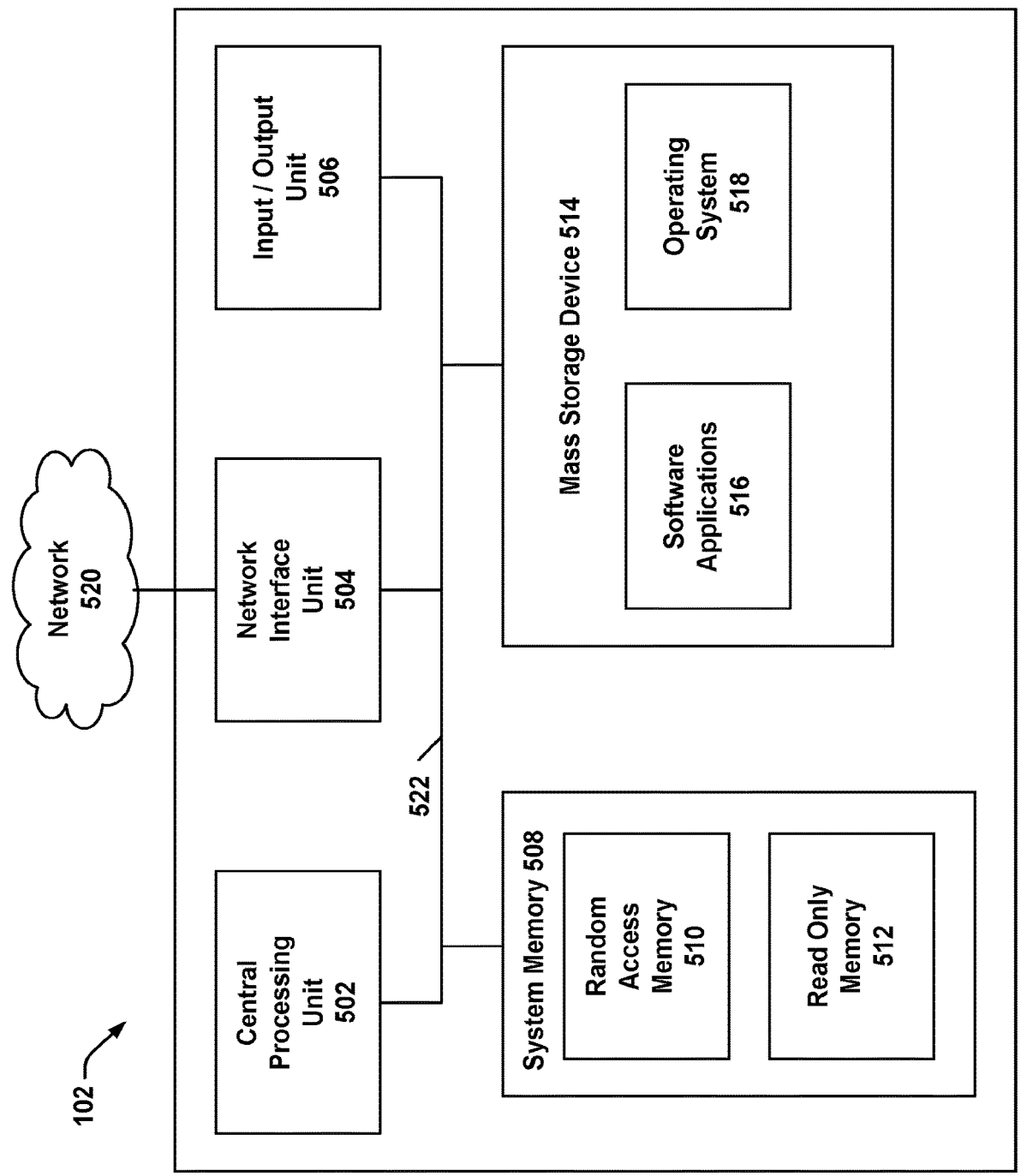
FIG. 5 is a block diagram illustrating portions of an example computer system.

FIG. 5 schematically illustrates an example of the server computer 102, which is suitable for implementing the predictive analytics 104 and other functions discussed above. The computer 102 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 102, such as during startup, is stored in the ROM 512. The server computer 102 further includes a mass storage device 514. The mass storage device 514 is able to store software instructions and data. As noted above, one or both of the databases 110, 112 could be implemented by the mass storage device 512, or one or both of the databases could be implemented by other computer systems accessible by the server 102. A central processing unit, system memory and mass storage device similar to that in FIG. 5 are also included in each of the devices providing the user interfaces 120.

The mass storage device 514 is connected to the CPU 502 through a mass storage controller (not shown) connected to the system bus 522. The mass storage device 514 and its associated computer-readable data storage media provide non-volatile, non-transitory storage for the server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology. CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 106.

According to various embodiments of the invention, the server computer 102 may operate in a networked environment using logical connections to remote network devices through the network 520, such as a wireless network, the Internet, or another type of network. The server computer 102 may connect to the network 520 through a network interface unit 504 connected to the system bus 522. It should be appreciated that the network interface unit 504 may also be utilized to connect to other types of networks and remote computing systems. The server computer 102 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the server computer 102 can store software instructions and data. The software instructions include an operating system 518 suitable for controlling the operation of the server computer 102. The mass storage device 514 and/or the RAM 510 also store software instructions, that when executed by the CPU 502, cause the server computer 102 to provide the functionality of the server computer 102 discussed in this document. For example, the mass storage device 514 and/or the RAM 510 can store software instructions that, when executed by the CPU 502, cause the server computer 102 to implement the preapproval engine 104 shown in FIG. 1 for applying the creditworthiness information 310 from the first database 110 to the rules 312 from the second database 112, among other things.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method, comprising:
   determining, by a computer server, a plurality of milestones for an approval process, wherein the plurality of milestones is stored in a first database;
   estimating, by the computer server and via a predictive analytics engine, start dates for each of the plurality of milestones;
   providing, by the computer server an application programming interface (API) to one or more service providers;
   receiving, by the computer server and via the API from the one or more service providers, information associated with the approval process;
   storing, by the computer server, the received information associated with the approval process in a second database;
   accessing, by the computer server, from the second database the information associated with the approval process;
   determining, by the computer server and via the predictive analytics engine, a risk of delay for the plurality of milestones based on the accessed information;
   estimating, by the computer server and via the predictive analytics engine, first adjusted start dates based on the determined risk of delay;
   determining, by the computer server and via the predictive analytics engine, alternative actions associated with the determined risk of delay;
   estimating, by the computer server and via the predictive analytics engine, second adjusted start dates based on the alternative actions; and
   generating and displaying, by the computer server over a network and to a user computer, a dynamic user interface that includes a display of the first adjusted start dates, the alternative actions, and the second adjusted start dates.

2. The method of claim 1, wherein the second database is an information database and wherein the computer server is connectable to the information database via a network.

3. The method of claim 1, further comprising receiving a selection of the alternative actions from a user via the dynamic user interface.

4. The method of claim 3, further comprising estimating the second adjusted start dates based on the selection received from the user via the dynamic user interface.

5. The method of claim 1, wherein the displaying is done in real time.

6. A non-transitory computer-readable data storage medium storing instructions that, when executed by a computer server, causes the computer server to perform steps comprising:
   determining a plurality of milestones for an approval process, wherein the plurality of milestones is stored in a first database;
   estimating, via a predictive analytics engine, start dates for each of the plurality of milestones;
   providing an application programming interface (API) to one or more service providers;
   receiving, via the API from one or more service providers, information associated with the approval process;
   storing the received information associated with the approval process in a second database;
   accessing from the second database the information associated with the approval process;
   determining, via a predictive analytics engine, a risk of delay for the plurality of milestones based on the accessed information;
   estimating, via a predictive analytics engine, first adjusted start dates based on the determined risk of delay;
   determining, via a predictive analytics engine, alternative actions associated with the determined risk of delay;
   estimating, via a predictive analytics engine, second adjusted start dates based on the alternative actions; and
   generating and displaying, over a network and to a user computer, a dynamic user interface that includes a display of the first adjusted start dates, the alternative actions, and the second adjusted start dates.

7. The non-transitory computer-readable data storage medium of claim 6, wherein the computer server is connectable to the first database and the second database via the network.

8. The non-transitory computer-readable data storage medium of claim 6, storing instructions that when executed by the computer server, causes the computer server to further perform steps comprising:
   receiving a selection of the alternative actions from a user via the dynamic user interface.

9. The non-transitory computer-readable data storage medium of claim 8, storing instructions that when executed by the computer server, causes the computer server to further perform steps comprising:
   estimating the second adjusted start dates based on the selection received from the user via the dynamic user interface.

10. The non-transitory computer-readable data storage medium of claim 6, wherein the displaying is done in real time.

11. A computer server, comprising:
    a computing processing unit; and
    a memory storing instructions that, when executed by the computing processing unit, causes the computing processing unit to perform steps comprising:
       determining a plurality of milestones for an approval process, wherein the plurality of milestones is stored in a first database;
       estimating, via a predictive analytics engine, start dates for each of the plurality of milestones;
       providing an application programming interface (API) to one or more service providers;
       receiving, via the API from one or more service providers, information associated with the approval process;
       storing the received information associated with the approval process in a second database;
       accessing from the second database the information associated with the approval process;
       determining, via a predictive analytics engine, a risk of delay for the plurality of milestones based on the accessed information;
       estimating, via a predictive analytics engine, first adjusted start dates based on the determined risk of delay;
       determining, via a predictive analytics engine, alternative actions associated with the determined risk of delay;
       estimating, via a predictive analytics engine, second adjusted start dates based on the alternative actions; and generating and displaying, over a network and to a user computer, a dynamic user interface that includes a display of the first adjusted start dates, the alternative actions, and the second adjusted start dates.

12. The computer server of claim 11, wherein the second database is an information database and wherein the computer server is connectable to the information database via a network.

13. The computer server of claim 11, the memory storing instructions that, when executed by the computer processing unit, causes the computer processing unit to further perform steps comprising:

receiving a selection of the alternative actions from a user via the dynamic user interface.

14. The computer server of claim 13, the memory storing instructions that, when executed by the computer processing unit, causes the computer processing unit to further perform steps comprising:

estimating the second adjusted start dates based on the selection received from the user via the dynamic user interface.

15. The computer server of claim 11, wherein the display of the dynamic user interface is done in real time.

\* \* \* \* \*